May 7, 1963

J. H. SMITH 3,088,859

METHODS AND APPARATUS FOR MAKING AND BONDING
NONWOVEN FABRICS

Filed Aug. 18, 1958

INVENTOR
JOSEPH HAROLD SMITH
BY
Alexander T. Kardos
ATTORNEY

Fig.14.

United States Patent Office 3,088,859
Patented May 7, 1963

3,088,859
METHODS AND APPARATUS FOR MAKING AND BONDING NONWOVEN FABRICS
Joseph Harold Smith, Amherst, Mass., assignor, by mesne assignments, to Johnson & Johnson, New Brunswick, N.J., a corporation of New Jersey
Filed Aug. 18, 1958, Ser. No. 755,681
14 Claims. (Cl. 156—26)

The present invention relates to methods and apparatus for making nonwoven fabrics. More particularly, the present invention is concerned with methods and apparatus for making and bonding nonwoven fabrics.

In co-pending commonly-assigned patent application Serial Number 567,275, filed February 23, 1956, now patent No. 2,862,251, granted December 2, 1958, there are disclosed methods and apparatus for making foraminous, self-sustaining nonwoven fabrics having the characteristic hand and drape of conventional textile fabrics, such as may be made by spinning, weaving or knitting operations. In these nonwoven fabrics, the individual fibers are arranged in elongated interconnected yarn- or strand-like bundles or groups of closely associated and substantially parallelized or aligned fiber segments. These strand-like groups of fiber segments may be arranged in definite predetermined patterns forming an open reticular structure wherein the interconnected strand-like groups extend substantially at any desired angle with respect to one another. The individual fibers are quite closely associated within the groups with the result that the groups appear to cross each other in strand-like fashion at clearly defined junctures to outline relatively distinct holes or fabric openings, somewhat similar to the interstices in an open-mesh or coarsely woven fabric.

The nonwoven fabrics formed of these interconnected strand-like groups are normally self-sustaining and have considerable utility as such. In some cases, however, it is often desired to give the fabrics increased strength and durability, enhanced washability and launderability, or the like, and conventional bonding techniques are often utilized to accomplish such purposes. In cases where a firmer hand with somewhat less drape can be tolerated, over-all bonding, that is, 100% surface coverage of the nonwoven fabric with the binder, is utilized. In other cases where a lower degree of washability and launderability can be tolerated, the so-called "island-bonding" techniques, with less than about 35% surface coverage with patterns of annuli, cross-hatches, or the like, are utilized. Where a commercially satisfactory blend of these desirable properties is required, the so-called miniature or micro-line bonding techniques are utilized.

In all of these bonding processes, however, no particular account is taken of the fact that the nonwoven fabric being bonded comprises fabric openings or voids, as well as interconnecting strand-like groups of fiber segments and junctures. As a consequence, the binder is applied indiscriminately not only to the fiber segments and junctures where it is needed but also in the fabric openings where it is not only needed but where it is not desired that binder material or other extraneous matter be deposited. This, of course, is particularly important when the open-mesh visual characteristics of the nonwoven fabric are desired, or where it is required that its foraminous and permeable properties be preserved.

Efforts to apply binder material only on the fiber segments and on the junctures thereof without binder deposition in the fabric openings have been made and have been successful. However, the deposition of binder of the fiber segments between the junctures is basically uneconomical and wasteful, inasmuch as binder deposited on the junctures only has been found to be sufficient to provide the necessary bonding action whereby the described desirable properties and characteristics are obtained.

Efforts to apply binder material only at the junctures themselves to the exclusion of the fiber segments between the junctures have been made but hitherto have not been completely successful. The difficulty of accurately aligning a plurality of binder applying means with the junctures of the fiber segments in an elastic, stretchable nonwoven fabric is considerable when it is realized that such junctures may measure less than 0.050 inch and in many cases may be as low as about 0.020 inch, or even less. The difficulty is further increased by the fact that the dimensions of the elastic, stretchable nonwoven fabric may be constantly changing and attenuating as it is being drawn through the coating or impregnating apparatus in which the binder is being applied. The problem of registry of the binder applying means and the junctures between the fiber segments is consequently a difficult one and it is a principal purpose of the present invention to provide methods and apparatus capable of providing such registry whereby improved bonded nonwoven fabrics are obtained.

It has been found that a foraminous, self-sustaining, bonded nonwoven fabric comprising fabric openings, groups of fiber segments, and junctures, as described previously, may be made and bonded whereby the bonding material is deposited substantially only at the junctures to bond the same. This may be accomplished by positioning and supporting the fibrous web starting material to be rearranged and bonded between an apertured member and a foraminous member, as described in said co-pending patent application, and subjecting the web to rearranging fluid forces which are exerted through certain selected apertures. In this way, the fabric openings, the groups of fiber segments, and the junctures are formed, with the fabric openings in registry with the selected apertures. Then, without removing the rearranged web from between the positioning and supporting means constituted of apertures and foramina, and while the fabric openings are still in registry with the selected apertures, the selected apertures are closed off or blocked and certain other apertures which were originally closed off or blocked during the rearranging step are opened. These other apertures are so positioned that they are in registry with the junctures of the groups of fiber segments of the rearranged nonwoven fabric. A binder material is then applied to the rearranged nonwoven fabric, such as by directing a spray of binder through these other apertures which have just been opened, whereby substantially only the fiber junctures are coated or impregnated with the binder. The rearranged nonwoven fabric so coated with binder is then further processed by drying and/or heating and curing of the binder, if required, and finished or further treated, as desired.

The fibrous web or layer which is processed to form the product of this invention may be produced by carding, garnetting, air deposition, fluid papermaking techniques, or the like. Carding is the preferred method inasmuch as it yields the most highly oriented starting material.

The present invention will be further described primarily with reference to webs produced by carding but it is to be pointed out that this is merely for illustrative purposes and is not to be construed as limitative of the present invention.

The webs produced by carding may contain various lengths of textile fibers, say, from about one-half inch in length up to about two and one-half inches or more in length, as well as mixtures thereof. If desired, the fibrous layer may include a minor proportion, less than 50% by weight and preferably less than about 25% by weight, of fibers other than those of textile length. These may be fibers such as papermaking length fibers, which extend down to about one-eighth of an inch in length or less, for example, which shorter fibers normally cannot be used in conventional carding operations.

Illustrative of the shorter length fibers which may be employed are the natural cellulosic fibers such as papermaking woodpulp and wood fibers and cotton linters, mineral fibers such as asbestos, or any of the hereinafter-mentioned fibers, if in lengths of less than one-half inch and down to about one-eighth inch or less.

It is preferred that the shorter papermaking fibers be unbeaten or substantially unhydrated, if a textile-like fabric is desired as the end product. In this connection, shorter hydrated fibers of woodpulp in a papermaking length, for instance, may be mixed with longer fibers in such a way that the longer fibers will contribute the strength desired in the resulting fabric while the shorter wood fibers will decrease its cost. Good results can also be obtained with a layer of hydrated woodpulp fibers which would introduce elements of a plastic mass into the fibrous sheet.

The fibrous starting material may also contain various types of particulate solids, including materials having potentially adhesive character or capable of providing visual or other sensory interest. If desired, the fibrous layer may also include special fibers, as for example fibers which are capable of curling, bending, stretching, shrinking, or otherwise deforming, after the nonwoven fabric has been produced. The main requirement for these added individual elements of the starting fibrous material is that they also must be capable of movement under the influence of the applied rearranging fluid force. Thus, this invention is not limited to the use of any particular fiber but can take advantage of many properties of different fibers, as well as mixtures of fibers.

For producing a nonwoven fabric having the characteristic hand and drape of a conventional textile fabric, the layer of starting material or base web may comprise natural vegetable and animal fibers such as cotton, silk, wool, vicuna, mohair, alpaca, flax, ramie, jute, abaca, etc.; the synthetic or man-made fibers such as the cellulosic fibers, notably cuprammonium, viscose or regenerated cellulose fibers; cross-linked cellulosic fibers such as "Corval" and "Topel"; cellulose ester fibers such as cellulose acetate such as "Celanese" and cellulose tri-acetate such as "Arnel"; the saponified cellulose ester fibers such as "Fortisan" and "Fortisan-36"; the polyamide fibers such as nylon 6 (polycaprolactam), nylon 66 (hexamethylene diamine-adipic acid), nylon 610 (hexamethylene diamine-sebacic acid), nylon 11 (11-amino undecanoic acid—"Rilsan"); protein fibers such as "Vicara"; halogenated hydrocarbon fibers such as "Teflon" (polytetrafluoroethylene); hydrocarbon fibers such as polyethylene, polypropylene and polyisobutylene; polyester fibers such as "Dacron"; vinyl fibers such as "Vinyon" and saran; dinitrile fibers such as "Darvan"; nitrile fibers such as "Zefran"; acrylic fibers such as "Dynel," "Verel," "Orlon," "Acrilan," "Creslan," etc.; mineral fibers such as glass, metal; etc.

The denier of the individual synthetic fibers referred to above is preferably in the range of the approximate thickness of the natural fibers mentioned and consequently deniers in the range of from about 1 to about 3 are preferred. However, where greater opacity or greater covering power is desired, deniers of down to about ¾ or even about ½ may be employed. Where greater bulk and loft, however, are desired, deniers of up to about 5.5, 6, 8, 10, 15, or higher, are suitable. The minimum and maximum denier would, of course, be dictated by the desires or requirements for producing a particular fabric, and by the machines and methods for producing the same.

The weight of the fibrous web or layer of starting material may be varied within relatively wide limits depending upon the requirements of the finished product. A thin web of fibers, such as produced by a card, may have a weight of from about 35 to about 95 grains per square yard. Such a thin fibrous web, however, is so fragile that its handling and manipulation is extremely difficult. In the usual case, therefore, from about 3 to about 12 or more of these webs are combined and processed in the combined form. In instances where products having a greater weight are desired, total web weights of as high as about 1800 or 2000 grains or more per square yard may be processed. Within the more commercial aspects of the present invention, however, web weights of from about 150 grains per square yard to about 850 grains per square yard are contemplated.

The treating fluid which is used to rearrange the fibers in the web in the method of this invention is preferably water, but it may also contain materials which it is desired to incorporate in the strand- or yarn-like product. For example, the treating liquid may be an aqueous liquor containing a dye or pigment, a flame-retardant agent, a moth- or mildew-proofing material, a wet-strength agent, an insecticide or germacide, a disinfectant, etc.

If desired, and particularly where the fiber selected is hydrophobic, the water used in the hydraulic rearrangement may be heated to facilitate fiber relaxation and rearrangement. Liquids other than water may also be used, either alone or with the water, to facilitate fiber relaxation or simply to modify the wetting action of the water upon the fibers for the purpose of changing the fiber lubricity to thereby facilitate rearrangement by fluid forces.

The binder material which is applied to the junctures of the fiber segments may be selected from a large group of known suitable adhesive bonding materials. Either dry, powdered, gaseous, aqueous or solvent systems may be used. Typical binder materials include: beaten cellulose jellies of woodpulp, caroa, ramie, etc.; natural gums including karaya, locust bean, gum arabic and others; animal and fish glues; starches; dextrins; synthetics such as cellulose ethers including carboxymethyl cellulose, hydroxyethyl cellulose, methyl cellulose and ethyl cellulose; cellulose esters including cellulose acetate and cellulose nitrate; vinyl resins including polyvinyl alcohol, polyvinyl acetate, vinyl acetal, polyvinyl chloride, polyvinyl butyral, the vinyl ethers; acrylates including ethyl acrylate and methyl, ethyl, n-butyl and isobutyl methacrylate; polyamide resins; epoxy resins; furan resins; melamine-formaldehyde; urea-formaldehyde; phenol-formaldehyde; resorcinol-formaldehyde; resorcinol-urea; natural and synthetic rubber; etc.

Although the preferred embodiment of the invention employs a separate heterogeneous binder material which is applied to the junctures of the fiber segments, it is to appreciated that the binding effect may be obtained by an autogenous solvent or other activating action upon the junctures. For example, if thermoplastic fibers such as cellulose acetate, the vinyl resins, etc., are used in the preparation of the fibrous web, they may be rendered potentially adhesive by the application thereto of a solvent, such as acetone, dioxane, etc., preferably in gaseous or vapor form.

In the application of such solvent activation principles, care should be taken that an excess of the solvent vapor be avoided so that only the junctures of the fiber segments are contacted and rendered adhesive and the major portion of the fabric remains unaffected.

In the accompanying drawings and following specification, I have illustrated and described preferred embodiments of the products, methods and apparatus embodying my invention but it is to be understood that my invention is not to be considered limited to the embodiments disclosed, except as determined by the scope of the appended claims. With reference to the accompanying drawings:

Figure 14:
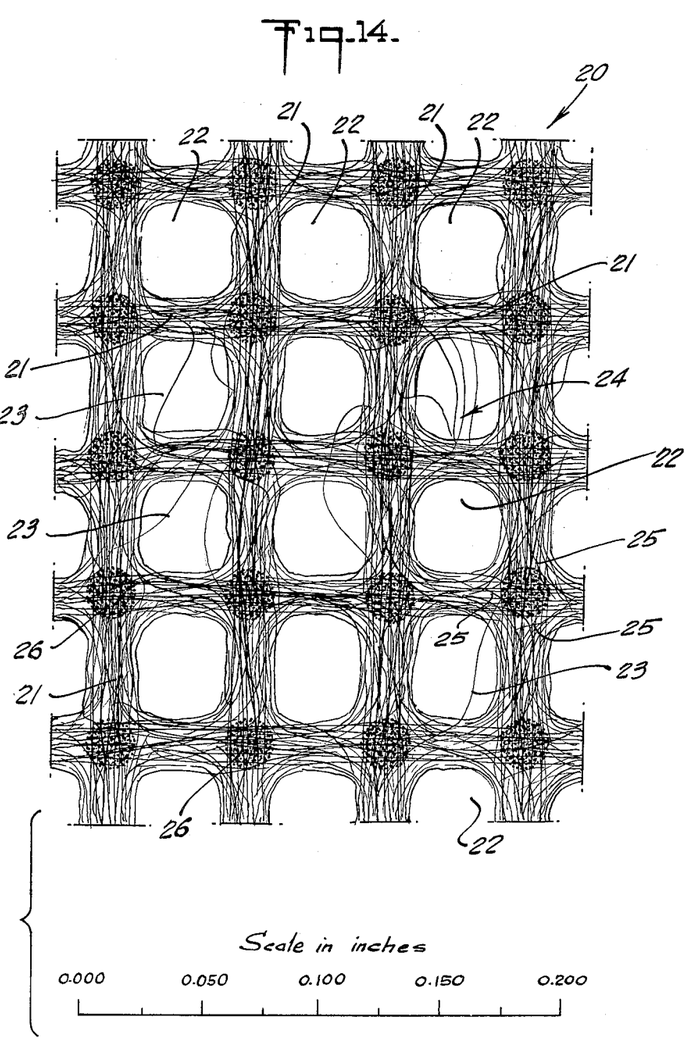
FIGURE 14 is an enlarged showing of a typical nonwoven fabric, according to one embodiment of the invention, at an approximate enlargement of about 24 to 1.

In the embodiment of the invention shown in the drawings, a typical nonwoven fabric 20 of the present invention is shown in FIGURE 14. This typical nonwoven fabric comprises elongated interconnected yarn-like bundles or groups 21 of closely associated and substantially parallelized or aligned fiber segments. In this particular embodiment, the bundles or groups 21 of fiber segments are arranged in a definite predetermined pattern forming a gauze-like reticular structure wherein interconnected bundles of fiber segments extend at angles of 90° and 180° to one another.

The individual fibers are quite closely associated in the bundles so that the bundles appear tight and strand-like and cross each other at clearly defined junctures to form relatively discrete and square voids or fabric openings 22 between them somewhat similar to the interstices in an open-mesh or coarsely woven fabric. The fiber bundles 21 extending in the vertical direction of FIGURE 14 appear to be slightly heavier and more tightly formed than the fiber bundles extending in the horizontal direction, probably because the fibers in the base web of fibrous starting material were oriented predominantly in this vertical direction.

There are a number of occasional fibers 23 which lie outside the main bundles 21 and extend at random between them. Some of these fibers 23 may combine to form irregularly-located small bundles 24 extending between the main bundles 21. The bundles 21 which come together at a given juncture 26 are interconnected by fibers 25 which are common to each of these bundles. The interconnected fibers 25 bend and cross over one another at each juncture 26 to form diamond-shaped fiber areas which appear similar to highway intersections.

Consideration of FIGURE 14 will make it apparent that deposition of a binder material in overall fashion to cover 100% or any substantial portion of the surface area of the nonwoven fabric 20 is uneconomical and wasteful inasmuch as a large proportion of the binder enters the voids or openings 22 whereas a lesser amount is applied to the fiber segments 21 or to the junctures 26 where it is needed. In addition, it is evident that the hand of the bonded nonwoven fabric will be materially affected by whether the binder is located only at the junctures or along the bundles of fiber segments connecting the junctures as well.

Figure 1:
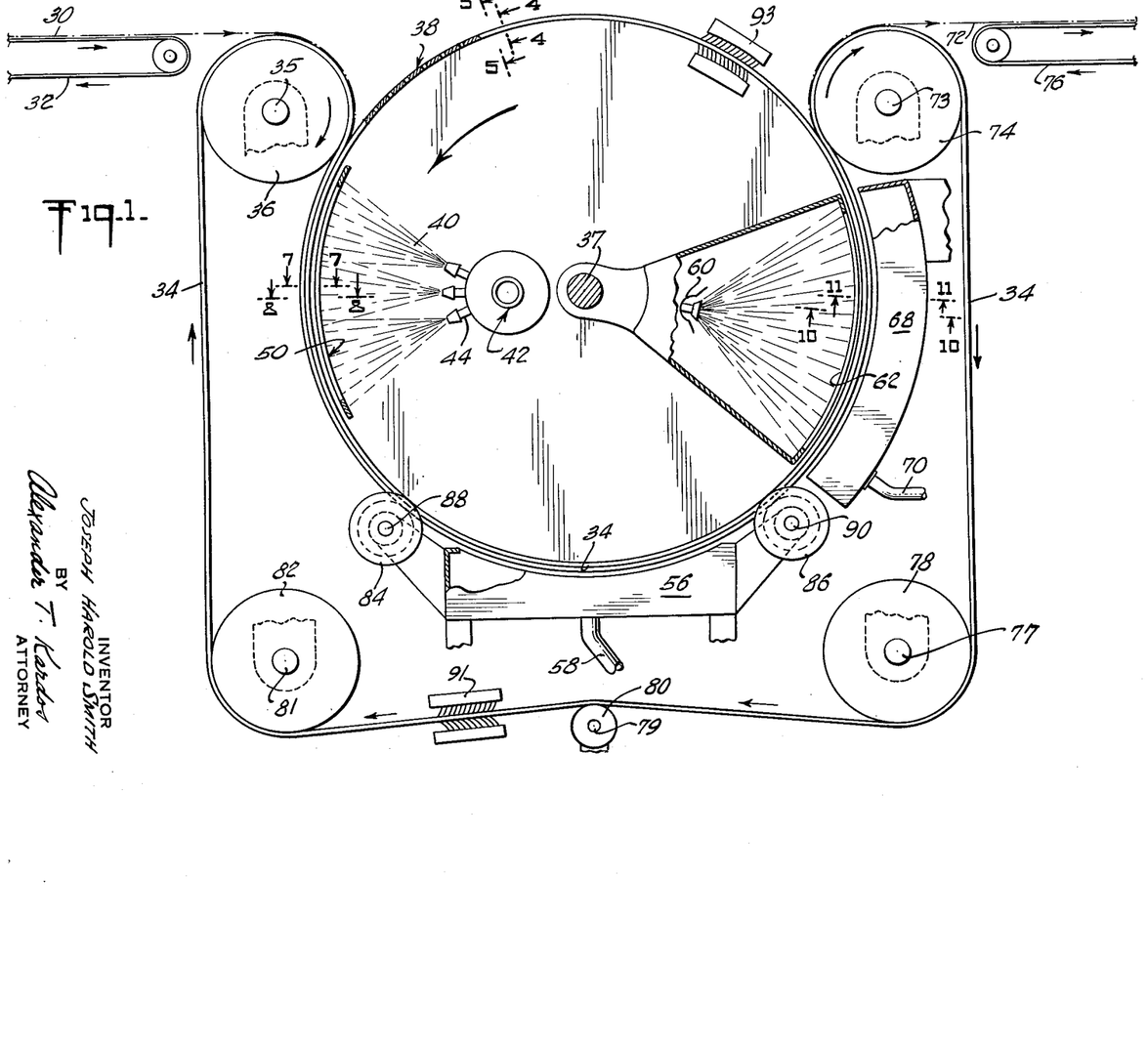
FIGURE 1 is a diagrammatic showing in elevation of a preferred embodiment of apparatus for carrying out the method of the present invention.

In FIGURE 1, there is diagrammatically disclosed a preferred embodiment of apparatus suitable for the deposition of a binder material substantially only at the junctures of the nonwoven fabric. In this figure, a fibrous web 30 is carried by a movable conveyor belt 32 from a conventional textile carding machine (not shown) and is deposited on the surface of a movable, endless, foraminous supporting member 34 such as a carrier made of an open-mesh plastic or wire belt or screen. The foraminous supporting member 34 is trained around the rotatable guide roller 36 rotating on shaft 35 and carries web 30 into contact with the periphery of a rotatable, apertured rearranging and bonding drum 38 rotating on main shaft 37. The rearranging and bonding drum 38 is generally similar in basic principle during a part of its operation to the rotatable, apertured, rearranging drum disclosed in the above-mentioned patent application. As will be pointed out hereinafter, there is, however, a basic difference in the arrangement of the apertures of the rearranging drum disclosed in said patent application and the arrangement of the apertures of the rearranging and bonding drum of the present invention.

The initial contact between the rearranging and bonding drum 38 and the fibrous web 30 carried by the foraminous supporting member or belt 34 is approximately at the 10 o'clock position of the rearranging drum 38, as viewed in FIGURE 1. It is noted that such contact forms a three-layer sandwich in which the rearranging and bonding drum 38 is innermost, the fibrous web 30 is centrally positioned, and the foraminous supporting member 34 is outermost. This three-layer sandwich moves around the periphery of the rearranging and bonding drum 38 and it is during selected portions or zones of this peripheral movement that fiber rearrangement and bonding take place successively.

Within the rearranging and bonding drum 38 there is positioned a header or a manifold to which a fluid, preferably water, is supplied through a conduit 42, under a desired pressure. Nozzles or jets 44 are provided on one face of the header and the fluid is projected therethrough under pressure at and through the three layer sandwich as it is moved in a path corresponding to the periphery of drum 38. As seen in FIGURE 1, the fluid being sprayed through the nozzles 44 is projected forcibly at and through the sandwich in a zone extending from about 10 o'clock to about 8 o'clock approximately. This zone will be referred to as the rearranging zone and the fluid rearranging principles and operations are applicable thereto.

Figure 2:
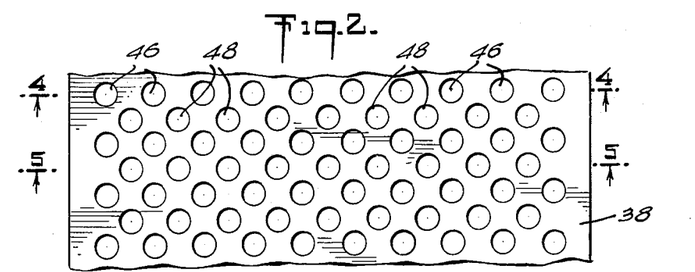
FIGURE 2 is a fragmentary showing in plan of an arrangement of the apertures in the peripheral surface of the rearranging drum of the apparatus of FIGURE 1.

In FIGURE 2 there is shown a fragmentary drawing in plan of a preferred arrangement of the apertures in the perforated peripheral surface of the rearranging drum 38. Such a showing is obtained by viewing the drum vertically at approximately the 12 o'clock position in FIGURE 1. It is noted that there are rearranging apertures 46 which, in FIGURE 2, are arranged in rows extending across the surface of the drum as well as circumferentially around the periphery of the drum. Alternating with the rearranging apertures 46 are intermediately-positioned bonding apertures 48 which also extend in rows across the surface of the drum as well as circumferentially around the periphery of the drum.

Figure 4:
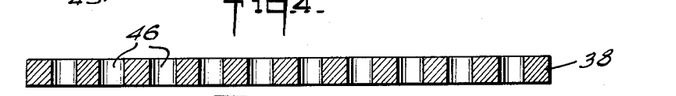
FIGURE 4 is a cross-section of a portion of the peripheral surface of the rearranging drum of FIGURES 1 and 2 taken on the line 4—4 thereof in the direction indicated.
Figure 5:
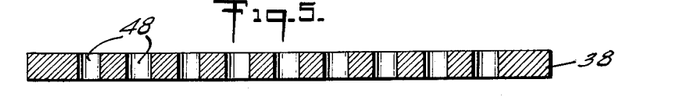
FIGURE 5 is a cross-section of a portion of the peripheral surface of the rearranging drum of FIGURES 1 and 2 taken on the line 5—5 thereof in the direction indicated.

The offset, alternating arrangement of the rearranging apertures 46 and the bonding apertures 48 is also shown in FIGURES 4 and 5. FIGURE 4 is a cross-section of a portion of the peripheral surface of the rearranging drum 38 of FIGURE 1 taken on the line 4—4 of FIGURE 1 or of FIGURE 2. FIGURE 5 is a cross-section of the peripheral surface of the rearranging drum 38 of FIGURE 1 taken on the line 5—5 of FIGURE 1 and FIGURE 2.

The distance between these two views is equal to the center-to-center spacing between a row of rearranging apertures 46 and a row of bonding apertures 48, as measured in a peripheral direction along the surface of the rearranging drum 38. Comparison of FIGURES 4 and 5 clearly indicates the offset and alternating arrangement of the rows of rearranging apertures 46 and bonding apertures 48.

Keeping in mind the principles involved in fluid rearrangement, it will be appreciated that if fluid is projected through the rearranging apertures 46, a rearranged nonwoven fabric of the general type illustrated in FIGURE 14 is obtained.

Such is exactly the operation of the rearranging drum in the rearranging zone extending from about 10 o'clock to about 8 o'clock thereof. Inside the rearranging drum, a stationary slotted grill 50 is provided for blocking the bonding apertures in a rearranging zone. Such a grill is shown in detail in FIGURE 6 and it is to be observed that there are alternating open slots 52 and alternating solid strips 54 which are in registry, respectively, with the peripheral rows of rearranging apertures 46 and bonding apertures 48. As a consequence, therefore, the rearranging fluid projected by the nozzles 44 penetrates through the open slots 52 in the stationary slotted grill 50, and then enters the sandwich through rearranging apertures 46 to rearrange the fibrous web centrally located therein. On the other hand, however, the rearranging fluid strikes against the solid strips 54 and is thus prevented from entering the bonding apertures 48.

Figure 6:
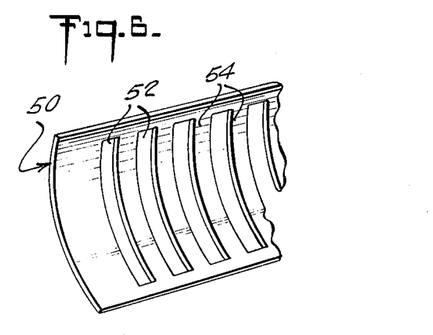
FIGURE 6 is a fragmentary perspective view of the stationary slotted grill for blocking the bonding apertures in the peripheral surface of the rearranging drum of FIGURES 1 and 2.

The stationary slotted grill 50 is preferably made of a rigid or semi-rigid construction so that it is able to retain its shape and configuration and thus accurately define the areas and apertures to be blocked and the areas and apertures to remain open. The stationary slotted grill 50 is preferably made of a synthetic plastic material and most desirably a thermosetting resin, such as a phenol-formaldehyde condensation product. The grill may also be made of a metallic material such as aluminum, stainless steel, or the like.

The spacing of the open slots 52 and the solid strips 54 is such that the open slots 52 permit free access of the rearranging fluid to the rearranging apertures 46 in the rearranging drum 38. The width of the solid strips 54 on the other hand, is sufficient to completely block the bonding apertures 48 in the rearranging drum 38.

The widths of the open slots 52 and the solid strips 54 can be varied by having a plurality of stationary slotted grills available, one for each type of rearranging drum to be used.

Figure 7:
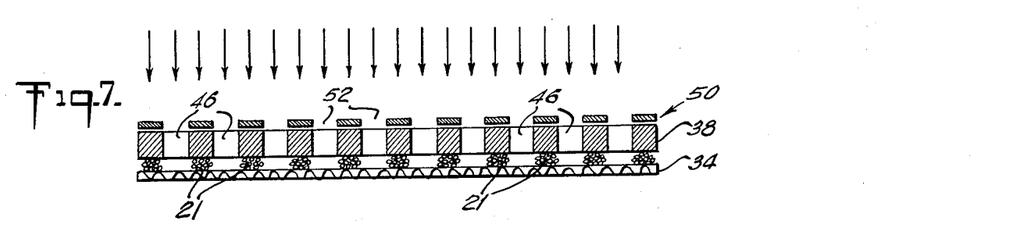
FIGURE 7 is a cross-section of a portion of the "sandwich" formed by the rearranging drum, foraminous supporting member and bonding aperture blocking grill of the apparatus of FIGURE 1, together with the associated fibrous starting material, taken on the line 7—7 of FIGURE 1 in the direction indicated, showing the rearranging apertures in said drum.
Figure 8:
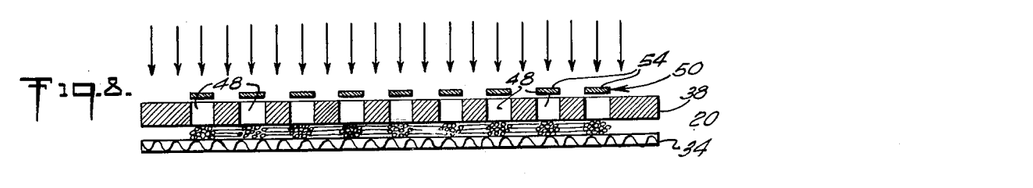
FIGURE 8 is a cross-section of a portion of the same "sandwich" as in FIGURE 7, taken on the line 8—8 of FIGURE 1 in the direction indicated, showing the bonding apertures in said drum.

The rearranging principles in operation are shown clearly in FIGURES 7 and 8. In FIGURE 7, which is cross-section of the peripheral surface of the rearranging drum 38 of FIGURE 1, taken through the centers of a row of rearranging apertures 46 therein, the rearranging fluid is shown as penetrating through the open slots 52 in the stationary slotted grill 50 and then proceeding through the sandwich formed by the rearranging drum 38, the intermediate fibrous material being rearranged, and the foraminous supporting member 34.

Reference to FIGURE 8, which is a cross-section of a portion of the peripheral surface of the rearranging drum 38, taken through the centers of a row of bonding apertures 48 therein, shows that the rearranging fluid in this instance strikes against the solid strips 54 in the stationary slotted grill 50 and is prevented from penetrating therethrough. As a consequence, the fabric openings are formed in registry with the rearranging apertures 46, the fiber segments are formed directly above and below and on the sides of the rearranging apertures 46, whereas the junctures of the fiber segments are formed at the diagonally opposite corners outside the rearranging apertures and are in registry with the blocked bonding apertures 48 in the rearranging drum 38.

By the time the sandwich has proceeded past the 8 o'clock position on the rearranging drum 38, fluid rearrangement thereof is completed and the rearranged fibrous web proceeds to the next zone.

A suction or vacuum assist in the form of a vacuum box 56 is provided adjacent the sandwich after it passes from the rearranging zone in order to facilitate and expedite the removal of the rearranging fluid from the rearranged nonwoven fabric to a desired reduced moisture content. A conduit 58 is provided leading from the vacuum box 56 to a conventional suction device (not shown).

As shown in FIGURE 1, the vacuum box extends from about 7 o'clock to about 5 o'clock on the rearranging drum 38. This position is not essential and, if desired, the vacuum box could be positioned directly outside the drum 38 and in alignment with the stationary slotted grill 50 to assist in the penetration and passage of the rearranging fluid through the sandwich. Furthermore, if desired, vacuum boxes may be positioned outside the drum 38 and aligned with the stationary slotted grill 50, as well as in the position shown in FIGURE 1.

The dewatered, rearranged nonwoven fabric proceeds around the periphery of the rearranging drum 38 and enters a bonding zone which extends from about 4 o'clock to about 2 o'clock on the rearranging drum, as viewed in FIGURE 1. During the passage of the sandwich through this zone, a binder material is sprayed thereon by pressure means 60. The operation in the bonding zone is basically different than the operation in the rearranging zone in that a stationary slotted grill 62 is provided in the bonding zone in order to block the rearranging apertures at this time instead of the bonding apertures.

Figure 9:
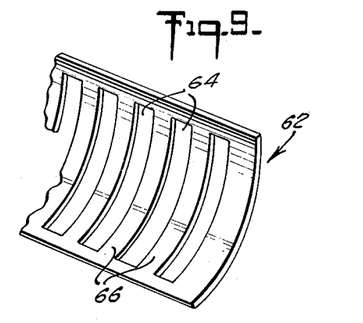
FIGURE 9 is a fragmentary perspective view of the stationary slotted grill for blocking the rearranging apertures in the peripheral surface of the rearranging drum of FIGURES 1 and 2.

As shown in greater detail in FIGURE 9, the stationary slotted grill 62 is somewhat basically similar in construction to the stationary slotted grill 50 except that the open slots 64 and the solid strips 66 in the stationary slotted grill 62 are offset by a width of exactly one row of apertures from the open slots 52 and solid strips 54 of the stationary slotted grill 50 which was employed in the rearranging zone.

Figure 10:
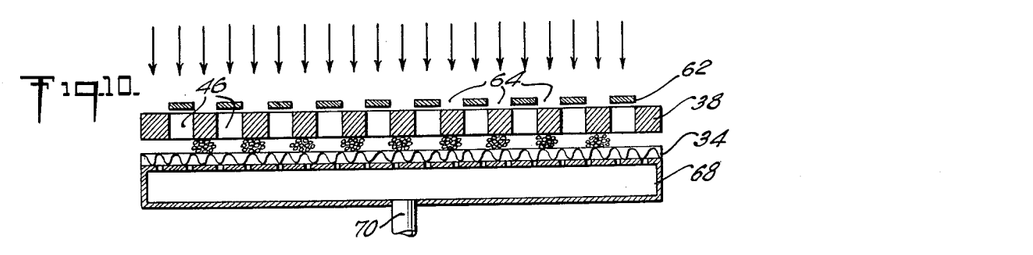
FIGURE 10 is a cross-section of a portion of the "sandwich" formed by the rearranging drum, foraminous supporting member and rearranging aperture blocking grill of the apparatus of FIGURE 1, together with the associated rearranged fibrous material, taken on the line 10—10 of FIGURE 1 in the direction indicated, showing the rearranging apertures in said drum.
Figure 11:
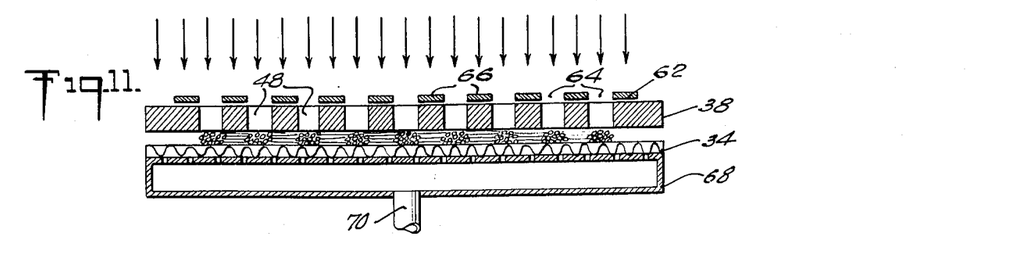
FIGURE 11 is a cross-section of a portion of the same "sandwich" as in FIGURE 10, taken on the line 11—11 of FIGURE 1 in the direction indicated, showing the bonding apertures in said drum.

As a result, and as shown in FIGURE 11, the binder material which is sprayed outwardly by pressure means 60 penetrates through the open slots 64 in the stationary slotted grill 62, and then passes through the bonding apertures 48 of the rearranging drum in its passage through the sandwich. As shown in FIG. 1, a housing may be provided about pressure means 60 to confine the travel of the binder to the bonding zone. The binder deposited on the rearranged non-woven fabric naturally is similar in outline to the bonding aperture and is circular, as shown in FIGURE 14. On the other hand, as shown in FIGURE 10, the binder material sprayed outwardly by pressure means 60 strikes against the solid strips 66 of the stationary slotted grill 62 and is prevented from entering the rearranging apertures 46 of the rearranging drum 38.

The stationary slotted grill 62 is preferably made of a rigid or semi-rigid construction so that it is able to retain its shape and configuration and thus accurately define the areas and apertures to be blocked and the areas and apertures to remain open. The stationary slotted grill 62 is preferably made of a synthetic plastic material and most desirably a thermosetting resin, such as a phenol-formaldehyde condensation product. The grill may also be made of a metallic material such as aluminum, stainless steel, or the like. Care should be taken that the material selected for the grill is resistant to or insoluble in the solvent system used as a carrier for the binder material.

The spacing of the open slots 64 and the solid strips 66 is such that the open slots 64 permit free access of the binder material to the bonding apertures 48 in the rearranging drum 38. The width of the solid strips 66 on the other hand, is sufficient to completely block the rearranging apertures 46 in the rearranging drum 38.

The widths of the open slots 64 and the solid strips 66 can be varied by having a plurality of stationary slotted grills available, one for each type of rearranging drum to be used.

The amount of force exerted by the binder material is so adjusted and controlled that it is considerably less than the force exerted by the rearranging fluid and consequently the binder material is deposited more gently in its circular shape on the junctures of the rearranged nonwoven fabric. The force exerted by the binder material is sufficiently low that substantially no rearrangement takes place in the bonding zone.

A vacuum assist is provided for the binder in the form of a vacuum box 68 and conduit means 70 leading to a suitable conventional suction device (not shown). This vacuum assist facilitates and expedites the deposition of the binder materials on the junctures of the nonwoven fabric.

The rearranged, bonded nonwoven fabric 72 continues on the periphery of the rearranging drum 38 to the guide roll 74 rotating on shaft 73 and is then carried by the foraminous supporting member 34 around guide roll 74 to be positioned on a movable conveyor belt 76 which carries the rearranged, bonded nonwoven fabric onwardly for further processing, as desired.

The foraminous supporting member 34 separates from the rearranged, bonded nonwoven fabric 72 at the periphery of guide roll 74 and is led downwardly around guide roll 78 rotating on shaft 77 over a tensioning and tracking guide roll 80 rotating on shaft 79, and around a guide roll 82 rotating on shaft 81 to be returned to guide roll 36 to complete its circuit and to carry additional fibrous web starting material 30 into contact with the rearranging drum 38. Guide rolls 36, 74, 78 and 82 may be positioned in slidable brackets which are adjustable to assist in the maintenance of the proper tension on the foraminous supporting member 34. This is, of course, in addition to the control exerted by the tensioning and tracking guide roll 80.

Flanged guide wheels 84 and 86 are mounted on rotatable shafts 88 and 90, respectively, and are in rolling, frictional guiding contact with the rearranging drum 38 to insure its proper rotation. The rearranging drum may be driven by either of the flanged guide wheels 84 or 86, or it may be driven by frictional contact with the foraminous supporting member 34. In the latter case, any one of the guide rolls, such as guide roll 74, for example, is positively driven by conventional power means (not shown) to bring about movement of the foraminous supporting member 34 and the rearranging drum 38.

In the operation of the apparatus of FIG. 1, it has occasionally been found that certain binder materials tend to block the openings in the apertured, rotatable rearranging drum 38 and in the foraminous supporting member 34. In such a case, a conventional cleaning device may be employed to continuously remove any binder material which may adhere to the rearranging drum 38 or the foraminous supporting member 34. In FIG. 1, bristle brushes 91 and 93 are illustrated which are capable of cleaning the openings in the rearranging drum 38 and the foraminous supporting member 34. Other conventional cleaning devices may be used. Illustrative of such other devices are aqueous or solvent cleaning baths.

In the event that it is desired to make a more complete separation of the rearranging zone and the bonding zone than that shown, a vertically positioned baffle or partition may be used inside the rearranging drum 38, for example, as shown in FIG. 36 of the aforesaid patent.

In the description of the above method and apparatus, reference was made to certain arrangements of apertures, such as shown in FIGURE 2. Such an arrangement is merely representative of a commercial embodiment of the preferred form of the invention. The rearranging apertures 46 and the bonding apertures 48 have approximately the same diameters in FIGURE 2. This is not necessarily so and the proportions of these apertures may be varied widely, depending upon the sizes of the fabric openings and the junctures in the required nonwoven fabric. For example, the bonding apertures may be larger than the rearranging apertures, although in most cases it has been found advantageous to have the bonding apertures equal to or less than the diameters of the rearranging apertures.

Figure 3:
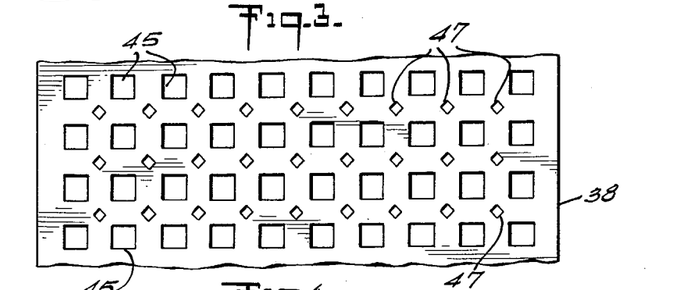
FIGURE 3 is a fragmentary showing of a preferred modification of the arrangement of the apertures in the peripheral surface of the rearranging drum of FIGURE 1.

Additionally, it is not necessary that the apertures be circular as shown, if other shapes of binder areas are desired. Other forms of apertures, including squares, rectangles, triangles, ellipses, ovals, polygons such as pentagons, hexagons, etc., may be used. An example of such other forms is illustrated in FIGURE 3, wherein rearranging apertures 45 are shown as substantially square-shaped and the bonding apertures 47 are illustrated as diamonds. It is appreciated that substantially any form of functional or ornamental aperture could be used depending upon the desires and requirements of the particular case.

Figure 12:
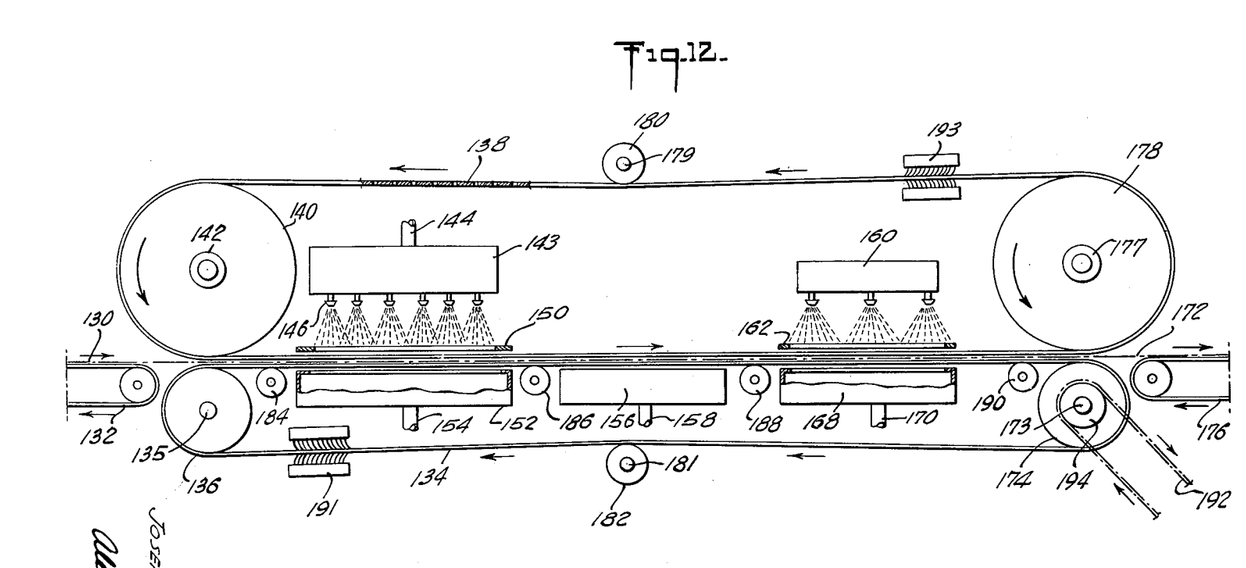
FIGURE 12 is a diagrammatic showing in elevation of another preferred embodiment of apparatus for carrying out the method and producing the product of the present invention.

In FIGURE 12, there is diagrammatically disclosed another preferred embodiment of apparatus suitable for the deposition of a binder material substantially only at the junctures of the nonwoven fabric. In this figure, a fibrous web 130 is carried by a conveyor 132 from a conventional textile carding machine (not shown) and is deposited on the surface of a movable, endless, foraminous supporting member 134, such as an open-mesh plastic or wire belt or screen. The foraminous supporting member 134 is trained around a rotatable guide roller 136 rotating on a shaft 135 and brings the fibrous web 130 into contact with a movable, apertured, rearranging belt 138 which is trained around a guide roll 140 rotating on a shaft 142. The guide rolls 136 and 140 are so adjustably positioned that the fibrous web 130 enters the nip between these rolls and substantially simultaneously contacts the endless foraminous supporting member 134 and the movable rearranging belt 138.

It is again noted that such an arrangement forms a three-layer sandwich in which the movable rearranging belt 138 is upermost, the fibrous web 130 is centrally positioned, and the foraminous supporting member 134 is lowermost. This three-layer sandwich moves forwardly or to the right, as viewed in FIGURE 12, and it is during selected portions or zones of this movement that fiber rearrangement and bonding take place successively.

Within the rearranging belt 138, there is positioned a header or a manifold 143 to which a fluid, preferably water, is supplied through a conduit 144 under a desired pressure. Nozzles or jets 146 are provided on the lower face of the header 143 and the fluid is projected therethrough under pressure at and through the three-layer sandwich as it is moved in a path corresponding to the surface of the foraminous supoprting member 134. This space below the header 143 will be referred to as the rearranging zone and the fluid rearranging principles and operations are applicable thereto.

The apertures in the rearranging belt 138 are very similar in arrangement and configuration to the apertures formed in the peripheral surface of the rearranging drum 38 previously described. Reference is made to FIGURE 2 which shows a preferred embodiment of apertures similar to those in the rearranging belt 138.

Keeping in mind the principles involved in fluid rearrangement, it will again be appreciated that if fluid is projected through the rearranging apertures in the rearranging belt 138, but not through the bonding apertures therein, a rearranged nonwoven fabric of the general type illustrated in FIGURE 14 will be obtained.

Figure 15:
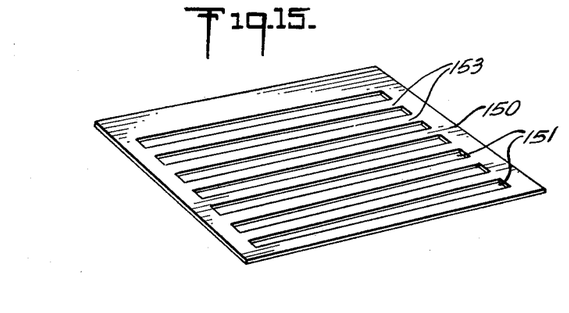
FIGURE 15 is a fragmentary perspective view of the stationary slotted grill for blocking the bonding apertures in the rearranging belt of FIGURE 12.

Such is exactly the operation of the rearranging belt in the rearranging zone. Inside the rearranging belt 138, a stationary slotted grill 150 is provided for blocking the bonding apertures in the rearranging zone. This grill 150 is very similar to the grill shown in detail in FIGURE 6 in that it comprises alternating open slots 151 and alternating solid strips 153 but differs therefrom in that it is relatively flat rather than curved. Such a flat grill is illustrated in FIGURE 15.

The rearranging fluid projected by the nozzles 146 therefore penetrates through the open slots in the stationary slotted grill 150 and then enters the sandwich through the rearranging apertures in the rearranging belt 138 to rearrange the fibrous web centrally located therein. On the other hand, however, the rearranging fluid strikes against the solid strips of the stationary slotted grill 150 and is thus prevented from entering the bonding apertures in the rearranging belt 138.

The rearranging principles in operation are very similar to those set forth in FIGURES 7 and 8 and reference thereto should be made at this time.

A suction or vacuum assist in the form of a vacuum box 152 is positioned directly below the upper reach of the foraminous supporting member 134 and in alignment with the stationary slotted grill 150 in order to expedite and facilitate the passage of the rearranging fluids through the sandwich. A conduit 154 is provided and leads to a conventional suction means (not shown) in order to withdraw air and fluid collected in the suction box 152.

The rearranged nonwoven fabric proceeds past the end of the stationary slotted grill 150 and passes over a second vacuum or suction assist which takes the form of a vacuum box 156 and an air conduit 158 which leads to a conventional suction means (not shown). If desired, either or both of the vacuum boxes 152 and 156 may be omitted.

Figure 16:
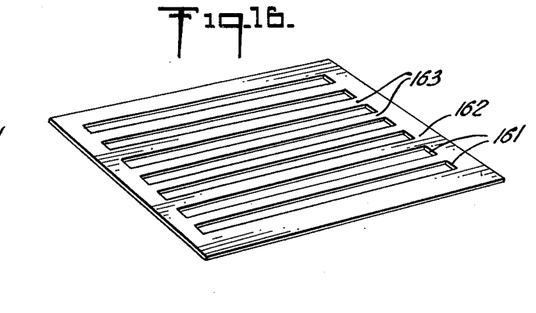
FIGURE 16 is a fragmentary perspective view of the stationary slotted grill for blocking the rearranging apertures in the rearranging belt of FIGURE 12.

The dewatered, rearranged nonwoven fabric then proceeds forwardly on the foraminous supporting member 134 and enters a bonding zone. During the passage of the sandwich through this zone, a binder material is sprayed thereon by pressure means 160. The operation in the binding zone is basically different than the operation in the rearranging zone in that a stationary slotted grill 162 is provided in the bonding zone in order to block the rearranging apertures at this time instead of the bonding apertures. The construction of the stationary slotted grill 162 is basically similar to the stationary slotted grill 62 previously described in that it comprises open slots 161 and solid strips 163 but differs therefrom in that it is relatively flat rather than curved. Such a flat grill is illustrated in FIGURE 16.

As a result of the arrangement of the stationary slotted grill 162, the binder material which is sprayed outwardly by pressure means 160 penetrates through the open slots 161 in the stationary slotted grill 162 and then passes through the bonding apertures of the rearranging belt 138 in its passage into the sandwich. On the other hand, however, the binder material sprayed outwardly by the pressure means 160 strikes against the solid strips 163 of the stationary slotted grill 162 and is prevented from entering the rearranging apertures of the rearranging belt 138.

The amount of force exerted by the binder material is so adjusted and controlled that it is considerably less than the force exerted by the rearranging fluid and consequently the binder material is deposited more gently on the junctures of the rearranged nonwoven fabric. The force exerted by the binder material is sufficiently low that substantially no rearrangement takes place in the bonding zone.

A vacuum or suction assist is provided for the binder material in the form of a vacuum box 168 and conduit means 170 leading to a suitable suction device (not shown). This vacuum assist facilitates and expedites the deposition of the binder materials on the junctures of the nonwoven fabric.

The rearranged, bonded nonwoven fabric 172 continues on the surface of the foraminous supporting member 134 to the guide roll 174 rotating on shaft 173. As the rearranged, bonded nonwoven fabric 172 leaves the periphery of guide roll 174, it is transferred to a conveyor belt 176 which carries it onwardly for further processing, as desired.

The rearranging belt 138 is trained around a guide roll 178 rotating on a shaft 177 and is directed rearwardly, or to the left, as shown in FIGURE 12 and passes under a tensioning or tracking guide roll 180 rotating on a shaft 179 and is returned to contact guide roll 140 to complete its circuit.

The foraminous supporting member 134 is trained downwardly and rearwardly around guide roll 174 and moves to the left, as viewed in FIGURE 12, passes over a tensioning and tracking guide roll 182 rotating on a shaft 181 to be returned to guide roll 136 to complete its circuit. Supporting rolls 184, 186, 188 and 190 are provided in order to assist in maintaining the upper reach of the foraminous supporting member 134 and the sandwich in a level, horizontal configuration.

The rearranging belt 138 and the foraminous supporting member 134 may be driven in any desired fashion. One means to accomplish this driving action is shown in FIGURE 12 as a driving belt 192 which is trained around a pulley 194 mounted on shaft 173 whereby the guide roll 174 is positively driven. The driving belt 192 is driven in from a source of power (not shown).

In the operation of the apparatus disclosed in FIGURE 12, it has occasionally been found that the binder material tends to block the openings in the movable rearranging belt 138 and in the foraminous supporting member 134. Devices may therefore be employed which will continuously clean the rearranging belt and the foraminous supporting member. Bristle brushes 191 and 193 are disclosed in FIGURE 12 and may be used to clean the openings in the rearranging belt and the foraminous supporting member. Other conventional cleaning devices may be used. Such other devices would include, for example, aqueous or solvent baths which will remove any adhered binder deposited in the apertures or foramina.

A partition or a baffle may be positioned vertically within the rearranging belt 138 if it is desired to form a better physical separation of the rearranging zone and the bonding zone.

Figure 13:
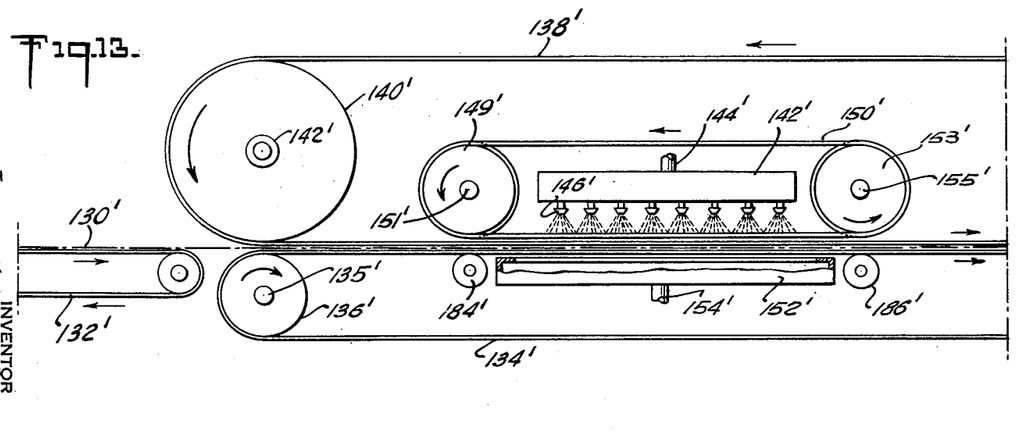
FIGURE 13 is a diagrammatic fragmentary showing of a modification of the slotted bonding aperture blocking grill, such as shown in FIGURE 12.

In FIGURE 13, there is diagrammatically disclosed another preferred embodiment of apparatus suitable for the deposition of a binder material substantially only at the junctures of the nonwoven fabric. In this figure, a fibrous web 130' is carried by a conveyor 132' from a conventional textile carding machine (not shown) and is deposited on the surface of a movable, endless, foraminous, supporting member 134', such as an open-mesh plastic or wire belt or screen. The foraminous supporting member 134' is trained around a rotatable guide roller 136' rotating on a shaft 135' and brings the fibrous web 130' into contact with a movable, apertured, rearranging belt 138'. The rearranging belt is trained around a rotatable guide roll 140' rotating on a shaft 142'. The guide rolls 136' and 140' are so adjustably positioned that the fibrous web 130' enters the nip between these guide rolls and substantially simultaneously contacts the endless, foraminous, supporting member 134' and the movable rearranging belt 138'.

It is again noted that such an arrangement forms a three-layer sandwich in which the rearranging belt 138' is uppermost, the fibrous web 130' is centrally positioned, and the foraminous supporting member 134' is lowermost. This three-layer sandwich moves forwardly, or to the right, as viewed in FIGURE 13, and it is during selected portions of this movement that fiber rearrangement and bonding take place successively.

Within the rearranging belt 138', there is positioned a header or a manifold to which a fluid, preferably water, is supplied through a conduit 144' under a desired pressure. Nozzles or jets 146' are provided on the lower face of the header 142' and the fluid is projected therethrough under pressure at and through the three-layer sandwich as it is moved in a path corresponding to the surface of the foraminous supporting member 134'. This space below the header 142' will be referred to as the rearranging zone and the fluid rearranging principles and operations are applicable thereto.

The apertures in the rearranging belt 138' are very similar in arrangement and configuration to the apertures formed in the peripheral surface of the rearranging drum 38 previously described. Reference is made to FIGURE 2 which shows a preferred embodiment of apertures similar to those in the rearranging belt 138'.

Keeping in mind the principles involved in fluid rearrangement, it will again be appreciated that if fluid is projected through the rearranging apertures in the rearranging belt 138' in the rearranging zone, but not through the bonding apertures therein, a rearranged nonwoven fabric of the general type illustrated in FIGURE 14 will be obtained.

Such is exactly the operation of the rearranging belt in the rearranging zone. Inside the rearranging belt 138', a series of spaced parallel strips or belts 150' are trained around grooved rotatable guide rolls 149' and 153'. The rate of rotation of the guide rolls 149' and 153' is such that the parallel belts 150' move preferably with the same linear speed as the rearranging belt 138' and the foraminous supporting member 134'.

The spaced parallel belts 150' are so positioned in the rearranging zone that they are capable of blocking the bonding apertures in the rearranging belt 138' during its passage through the rearranging zone. As a consequence, they function in exactly the same manner as the solid strips 153 in the flat slotted grill 150 illustrated in FIGURE 15. If desired, a cleaning means, such as a pair of cleaning brushes, may be employed to clean the parallel belts. Such cleaning brushes are preferably positioned on the upper reach of the parallel belts above the manifold 142'.

The rearranging fluid projected from nozzles 146' therefore penetrates through the open spaces between the parallel belts 150', then through the rearranging apertures in the rearranging belt and through the fibrous web 130' to rearrange the same, as previously described. On the other hand, however, the rearranging fluid strikes against the surfaces of the parallel belts 150' and is thus prevented from entering the bonding apertures in the foraminous supporting member 134'.

The rearranging principles in operation are very similar to those illustrated in FIGURES 7 and 8 and reference thereto should be made at this time.

A suction or vacuum assist in the form of a vacuum box 152' is positioned directly below the upper reach of the foraminous supporting member 134' and is in substantial alignment with movable parallel belts 150'. Such an arrangement expedites and facilitates the passage of the rearranging fluid through the sandwich. A conduit 154' is provided and leads to a conventional suction device (not shown) in order to remove air and fluid collected in the suction box 152'.

The rearranged nonwoven fabric then proceeds past the end of the movable belts 150', passes over a second vacuum or suction assist (not shown), enters a bonding zone, and, in general, goes through the same operations illustrated in FIGURE 12, with the exception that the stationary slotted grill 162 is replaced with a series of spaced parallel strips or belts very similar in construction and configuration to the parallel belts 150. These latter parallel belts are, of course, shifted laterally exactly one row of apertures so that the rearranging apertures in the rearranging belt 138 are blocked in the bonding zone, whereas the bonding apertures remain open.

Supporting rolls 184', 186', etc., are provided in order to assist in maintaining the upper reach of the foraminous supporting member 134' and the sandwich in a level, horizontal configuration. Other apparatus disclosed in FIGURE 12 will be employed with the apparatus of FIGURE 13 in the same fashion as disclosed previously.

The parallel belts 150' are preferably made of flexible stainless steel and are so positioned as to exert a slight pressure against the rearranging belt 138'. Other materials, such as synthetic or natural rubber, may be employed for belts, providing that they possess sufficient strength and flexibility so as to maintain substantial linearity during their movement in the rearranging zone.

With reference to bristle brushes 91, 93, 191 and 193, it has frequently been found that a suction cleaning device is desirable in order that any materials collected thereon may be continuously and readily removed.

It has also been found desirable, especially when particulate binder materials are used, to insure that the apertures of the rearranging drum 38 be relatively dry. Such may be accomplished by using a high vacuum in the vacuum box 56 or installing an auxiliary heating means, such as a bank of infra-red lamps within the rearranging drum 38 at approximately the four o'clock position thereof.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example I*

The starting material is a 36" wide card web of viscose rayon fibers weighing about 200 grains per square yard and containing fibers having a length of about 1 9/16 inches and a denier of about 1½. The apparatus used is similar to that illustrated in FIGURE 1. The card web is advanced at a velocity of about 40 yards per minute. The rearranging fluid is water at room temperature and the binder material is polyvinyl acetate.

In the rearranging and bonding drum, the rearranging apertures are circular and are approximately 0.037 inch in diameter. The bonding apertures are also circular and are approximately 0.020 inch in diameter. In the stationary slotted grill for blocking the bonding apertures, the open slots measure approximately 0.037 inch in width and the solid strips measure approximately 0.020 inch.

In the stationary slotted grill for blocking the rearranging apertures, the open slots measure approximately 0.020 inch in width and the solid strips measure approximately 0.037 inch in width.

The card web is rearranged and formed into a nonwoven fabric of the type illustrated in FIGURE 14. The binder material is deposited substantially only at the junctures of the fiber segments to bond the nonwoven fabric satisfactorily.

The resulting nonwoven fabric is capable of being used as such and finds utility as a place mat, for example.

*Example II*

The procedures set forth in Example I are followed substantially as set forth therein with the exception that the diameter of the rearranging apertures is increased to 0.050 inch and the diameter of the bonding apertures is increased to 0.030 inch. In the same way, in the stationary slotted grill for blocking the bonding apertures the open slots measure 0.050 inch in width and the solid strips measure 0.030 inch in width. In the stationary slotted grill for blocking the rearranging apertures, the open slots measure 0.030 inch in width and the solid strips measure 0.050 inch in width.

The resulting bonded nonwoven fabric is usable as such and finds utility as a place mat, for example.

*Example III*

The starting material is a 36" wide card web of viscose rayon fibers weighing about 200 grains per square yard and containing fibers having a length of about 1 9/16 inches and a denier of about 1½. The apparatus used is similar to that illustrated in FIGURE 12. The card web is advanced at a velocity of about 40 yards per minute. The treating fluid is water at room temperature and the binder material is polyvinyl acetate.

In the rearranging and bonding belt, the rearranging apertures are circular and are approximately 0.037 inch in diameter and the bonding apertures are also circular and are approximately 0.020 inch in diameter. In the stationary slotted grill for blocking the bonding apertures, the open slots measure approximately 0.037 inch in width and the solid strips measure approximately 0.020 inch. In the stationary slotted grill for blocking the rearranging apertures, the open slots measure approximately 0.020 inch in width and the solid strips measure approximately 0.037 inch in width.

The card web is rearranged and formed into a nonwoven fabric of the type illustrated in FIGURE 14. The binder material is deposited substantially only at the junctures of the fiber segments to bond the nonwoven fabric satisfactorily.

The resulting nonwoven fabric is capable of being used as such and finds utility as a place mat, for example.

Although several specific examples of the inventive concept have been described, the same should not be construed as limited thereby nor to the specific features and particular details mentioned therein, but to include various other features and details as set forth in the claims appended hereto. It is understood that any suitable changes, modifications and variations may be made without departing from the spirit and scope of the inventive concept.

What is claimed is:

1. A machine for rearranging and bonding the fibers in a unitary web of fibrous starting material whose individual fibers are capable of movement within the web under the influence of applied fluid forces, which comprises: a first movable member having an apertured surface, the apertures in said surface comprising a group of rearranging apertures disposed in a given pattern and a group of bonding apertures interspaced therebetween to form another pattern; a second movable member having a foraminous surface, said first and second members being disposed with said surfaces in close adjacency throughout a substantial area and movable in the same direction at substantially the same rate of speed to provide therebetween a rearranging zone and, after said members have moved past a particular point, a bonding zone; means to move said first and second members as aforesaid; means for feeding the aforementioned web of starting material between said first and second members; means for causing fluid to pass through said rearranging apertures but not through said bonding apertures in said first member while said apertures are in the rearranging zone, through the web of starting material, and through said second member whereby the web of fibrous starting material is rearranged into a plurality of openings defined by groups of fiber segments interconnected at junctures, said openings being in registry with said group of rearranging apertures; and means for causing a binder to pass through said group of bonding apertures but not through said rearranging apertures in said first member while said apertures are in the bonding zone, said junctures being in registry with said second group of apertures, whereby substantially only the junctures have binder applied thereto and are bonded thereby.

2. A machine for rearranging and bonding the fibers in a unitary web of fibrous starting material whose individual fibers are capable of movement within the web under the influence of applied fluid forces, which comprises: a rotatable drum having an apertured surface; a belt having a foraminous surface, said drum and said belt being disposed with said surfaces in close adjacency throughout a substantial area to provide therebetween a rearranging zone and a bonding zone; means to rotate said drum and to move said belt so that the said surfaces in close adjacency move in the same direction at substantially the same rate of speed; means for feeding the aforementioned web of starting material between said drum and said belt; means for causing fluid to pass only through a first group of apertures in said drum in the rearranging zone, through the web of starting material, and through said belt whereby the web of fibrous starting material is rearranged into a plurality of openings defined by groups of fiber segments interconnected at junctures, said openings being in registry with said first group of apertures; and means for causing a binder to pass only through a second group of apertures in said drum in the bonding zone, said second group of apertures being located in the areas of said drum lying between said first group of apertures so that the junctures of said interconnected fiber segments are in registry, while in the bonding zone, with said second group of apertures, whereby substantially only the junctures have binder applied thereto and are bonded thereby.

3. A machine for rearranging and bonding the fibers in a unitary web of fibrous starting material whose individual fibers are capable of movement within the web under the influence of applied fluid forces, which comprises: a first movable member having an apertured surface; a second member having a foraminous surface, said first and second members being disposed with said surfaces in close adjacency throughout a substantial area to provide therebetween a rearranging zone and a bonding zone; means to move said first and second members so that said adjacent surfaces move in the same direction at substantially the same rate of speed; means for feeding the aforementioned web of starting material between said first and second members; means for causing fluid to pass through a first group of apertures in said first member in the rearranging zone, then through the web of starting material, and finally through said second member whereby the web of fibrous starting material is rearranged into a plurality of openings defined by groups of fiber segments interconnected at junctures, said openings being in registry with said first group of apertures; means to prevent said fluid from passing through a second group of apertures in said first member in the rearranging zone; means for causing a binder to pass through a second group of apertures in said first member in the bonding zone, said junctures being in registry with said second group of apertures; and means to prevent said binder from passing through the first group of apertures in said first member in said bonding zone, whereby substantially only the junctures have binder applied thereto and are bonded thereby.

4. A machine for rearranging and bonding the fibers in a unitary web of fibrous starting material whose individual fibers are capable of movement within the web under the influence of applied fluid forces, which comprises: a rotatable drum having an apertured surface; a belt having a foraminous surface, said drum and said belt being disposed with said surfaces in close adjacency throughout a substantial area to provide therebetween a rearranging zone and a bonding zone; means to rotate said drum and to move said belt so that the said surfaces in close adjacency move in the same direction at substantially the same rate of speed; means for feeding the aforementioned web of starting material between said drum and said belt; means for causing fluid to pass through a first group of apertures in said drum in the rearranging zone, then through the web of starting material and finally through said belt whereby the web of fibrous starting material is rearranged into a plurality of openings defined by groups of fiber segments interconnected at junctures, said openings being in registry with said first group of apertures; means to prevent said fluid from passing through a second group of apertures in said drum in the rearranging zone; means for causing a binder to pass through a second group of apertures in said drum in the bonding zone, said junctures being in registry with said second group of apertures; and means to prevent said binder from passing through the first group of apertures in said drum in said bonding zone, whereby substantially only the junctures have binder applied thereto and are bonded thereby.

5. A machine for rearranging and bonding the fibers in a unitary web of fibrous starting material whose individual fibers are capable of movement within the web under the influence of applied fluid forces, which comprises: a first movable member having a surface containing rearranging apertures and bonding apertures; a second movable member having a foraminous surface, said first and second members being disposed with said surfaces in close adjacency throughout a substantial area to provide therebetween a rearranging zone and a bonding zone; means to move said first and second members so that said adjacent surfaces move in the same direction at substantially the same rate of speed; means for feeding the aforementioned web of starting material between said first and second members; devices for causing fluid to pass through said rearranging apertures but not through said bonding apertures in said first member in the rearranging zone, then through the web of starting material, and finally through said second member whereby the web of fibrous starting material is rearranged into a plurality of openings defined by groups of fiber segments interconnected at junctures, said openings being in registry with said rearranging apertures; and devices for causing a binder to pass through said bonding apertures but not through said rearranging apertures in said first member in the bonding zone, said junctures being in registry with said bonding apertures, whereby substantially only the junctures have binder applied thereto and are bonded thereby.

6. A machine for rearranging and bonding the fibers in a unitary web of fibrous starting material whose individual fibers are capable of movement within the web under the influence of applied fluid forces, which comprises: a rotatable drum having a surface containing rearranging apertures and bonding apertures; a movable belt having a foraminous surface, said drum and said belt being disposed with said surfaces in close adjacency throughout a substantial area to provide therebetween a rearranging zone and a bonding zone; means to rotate said drum and to move said belt so that the said surfaces in close adjacency move in the same direction at substantially the same rate of speed; means for feeding the aforementioned web of starting material between said drum and said belt; devices for causing liquid to pass through said rearranging apertures but not through said bonding apertures in said drum in the rearranging zone, then through the web of starting material, and finally through said belt whereby the web of fibrous starting material is rearranged into a plurality of openings defined by groups of fiber segments interconnected at junctures, said openings being in registry with said rearranging apertures; and devices for causing a binder to pass through said bonding apertures but not through said rearranging apertures in said drum in the bonding zone, said junctures being in registry with said bonding apertures, whereby substantially only the junctures have binder applied thereto and are bonded thereby.

7. The method of rearranging and bonding the fibers in a web of fibrous starting material, the individual fibers of which are capable of movement within the web under the influence of an applied fluid, which comprises: positioning the starting material in a moving region, said region comprising a rearranging zone and, after it has moved past a particular point, a bonding zone, said region being bounded by means defining rearranging apertures disposed in a given pattern and means defining foramina smaller than said apertures; while said starting material is in said rearranging zone passing a fluid through said rearranging apertures and through said starting material to rearrange individual fibers thereof into a plurality of openings defined by groups of fiber segments interconnected at junctures, said openings defined by the rearranged fibers being formed in registry with the rearranging apertures; and while said rearranged fibrous material is in said bonding zone applying a treating material thereto only at said junctures, whereby substantially only the junctures are treated and bonded.

8. The method of rearranging and bonding the fibers in a web of fibrous starting material, the individual fibers of which are capable of movement within the web under the influence of an applied fluid, which comprises: positioning the starting material in a region comprising successively, a rearranging zone and a bonding zone between means defining rearranging apertures and bonding apertures and means defining foramina smaller than said rearranging and bonding apertures; moving the assemblage of the starting material and the two means as a unit successively through said rearranging zone and said bonding zone; as said assemblage is moving through the rearranging zone, passing a fluid through said rearranging apertures but not through said bonding apertures, through said starting material and through said foramina to rearrange individual fibers of the starting material into a plurality of openings defined by groups of fiber segments interconnected at junctures; and as said assemblage is passing through the bonding zone, applying a treating material to the rearranged starting material through said bonding apertures but not through said rearranging apertures, whereby substantially only the junctures are treated and bonded.

9. The method of rearranging and bonding the fibers in a web of fibrous starting material, the individual fibers of which are capable of movement within the web under the influence of an applied fluid, which comprises: positioning the starting material in a region comprising successively, a rearranging zone and a bonding zone between means defining rearranging apertures and bonding apertures and means defining foramina smaller than said apertures; moving the assemblage of the starting material and the two means as a unit successively through said rearranging zone and said bonding zone; as said assemblage is moving through the rearranging zone, passing a fluid through said rearranging apertures, then through said starting material to rearrange individual fibers thereof into a plurality of openings defined by groups of fiber segments interconnected at junctures; preventing said fluid from passing through the bonding apertures in the rearranging zone; as said assemblage is passing through the bonding zone, applying a treating material through said bonding apertures; and preventing said treating material from passing through the rearranging apertures in the bonding zone, whereby substantially only the junctures are treated and bonded.

10. A machine for rearranging and bonding the fibers in a unitary web of fibrous starting material whose individual fibers are capable of movement within the web under the influence of applied fluid forces, which comprises: a first movable member having an apertured surface, the apertures in said surface comprising a group of rearranging apertures disposed in a given pattern and a group of bonding apertures interspaced therebetween to form another pattern; a second movable member having a foraminous surface, said first and second members being disposed with said surfaces in close adjacency throughout a substantial area and movable in the same direction at substantially the same rate of speed to provide therebetween a rearranging zone and, after said members have moved past a particular point, a bonding zone; means to move said first and second members as aforesaid; means for feeding the aforementioned web of starting material between said first and said second members at substantially the same rate of speed as said members; means for causing fluid to pass through said rearranging apertures but not through said bonding apertures in said first member while said apertures are in the rearranging zone, through the web of starting material, and through said second member whereby the web of fibrous starting material is rearranged into a plurality of openings defined by groups of fiber segments interconnected at junctures, said openings being in registry with said group of rearranging apertures; and means for causing a binder to pass through said group of bonding apertures but not through said rearranging apertures in said first member while said apertures are in the bonding zone, said junctures being in registry with said second group of apertures, whereby substantially only the junctures have binder applied thereto and are bonded thereby.

11. A machine for rearranging and bonding the fibers in a unitary web of fibrous starting material whose individual fibers are capable of movement within the web under the influence of applied fluid forces, which comprises: a rotatable drum having an apertured surface; a belt having a foraminous surface, said drum and said belt being disposed with said surfaces in close adjacency throughout a substantial area to provide therebetween a rearranging zone and a bonding zone; means to rotate said drum and to move said belt so that the said surfaces in close adjacency move in the same direction at substantially the same rate of speed; means for feeding the aforementioned web of starting material between said drum and said belt; means within said drum for projecting a fluid against the inner wall of said drum; means for causing the fluid to pass only through a first group of apertures in said drum in the rearranging zone, through the web of starting material, and through said belt whereby the web of fibrous starting material is rearranged into a plurality of openings defined by groups of fiber segments interconnected at junctures, said openings being in registry with said first group of apertures; and means for causing a binder to pass only through a second group of apertures in said drum in the bonding zone, said second group of apertures being located in the areas of said drum lying between said first group of apertures so that the junctures of said interconnected fiber segments are in registry, while in the bonding zone, with said second group of apertures, whereby substantially only the junctures have binder applied thereto and are bonded thereby.

12. The method of rearranging and bonding the fibers in a web of fibrous starting material, the individual fibers of which are capable of movement within the web under the influence of an applied fluid, which comprises: positioning the starting material in a moving region, said region comprising a rearranging zone and, after it has moved past a particular point, a bonding zone, said region being bounded by means defining rearranging apertures disposed in a given pattern and means defining foramina smaller than said apertures; while said starting material is in said rearranging zone passing a fluid through said rearranging apertures and through said starting material to rearrange individual fibers thereof into a plurality of openings defined by groups of fiber segments interconnected at junctures, said openings defined by the rearranged fibers being formed in registry with the rearranging apertures; and while said rearranged fibrous material is in said bonding zone applying a binder material thereto only at said junctures, whereby substantially only the junctures are bonded.

13. The method of rearranging and bonding the fibers in a web of fibrous starting material, the individual fibers of which are capable of movement within the web under the influence of an applied fluid, which comprises: positioning the starting material in a moving region, said region comprising a rearranging zone and, after it has moved past a particular point, a bonding zone, said region being bounded by means defining rearranging apertures disposed in a given pattern and means defining foramina smaller than said apertures; while said starting material is in said rearranging zone passing a liquid through said rearranging apertures and through said starting material to rearrange individual fibers thereof into a plurality of openings defined by groups of fiber segments interconnected at junctures, said openings defined by the rearranged fibers being formed in registry with the rearranging apertures; and while said rearranged fibrous material is in said bonding zone applying a treating material thereto only at said junctures, whereby substantially only the junctures are treated and bonded.

14. The method of rearranging and bonding the fibers in a web of fibrous starting material, the individual fibers of which are capable of movement within the web under the influence of an applied fluid, which comprises: positioning the starting material in a moving region, said region comprising a rearranging zone and, after it has moved past a particular point, a bonding zone, said region being bounded by means defining rearranging apertures disposed in a given pattern and means defining foramina smaller than said apertures; while said starting material is in said rearranging zone passing a liquid through said rearranging apertures and through said starting material to rearrange individual fibers thereof into a plurality of openings defined by groups of fiber segments interconnected at junctures, said openings defined by the rearranged fibers being formed in registry with the rearranging apertures; and while said rearranged fibrous material is in said bonding zone applying a binder material thereto only at said junctures whereby substantially only the junctures are bonded.

References Cited in the file of this patent

UNITED STATES PATENTS

| | | |
|---|---|---|
| 2,545,952 | Goldman | Mar. 20, 1951 |
| 2,698,574 | Dougherty et al. | Jan. 4, 1955 |
| 2,782,130 | Ness et al. | Feb. 19, 1957 |
| 2,862,251 | Kalwaites | Dec. 2, 1958 |